Nov. 1, 1955     C. P. LILJENGREN     2,722,267
SEAT SPRING CONSTRUCTION

Original Filed Dec. 23, 1952     6 Sheets-Sheet 1

INVENTOR
Curtis P. Liljengren
BY
Arthur Middleton
ATTORNEY

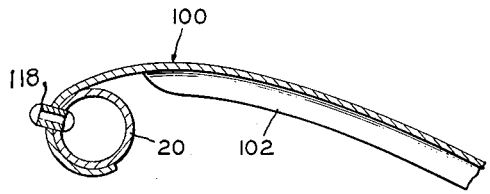
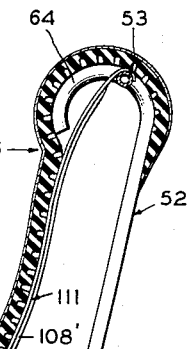
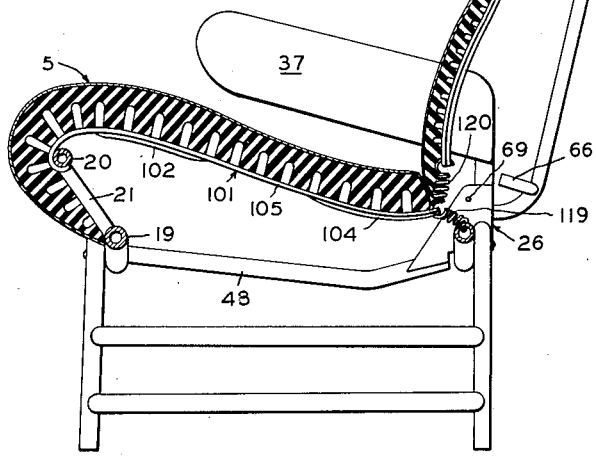
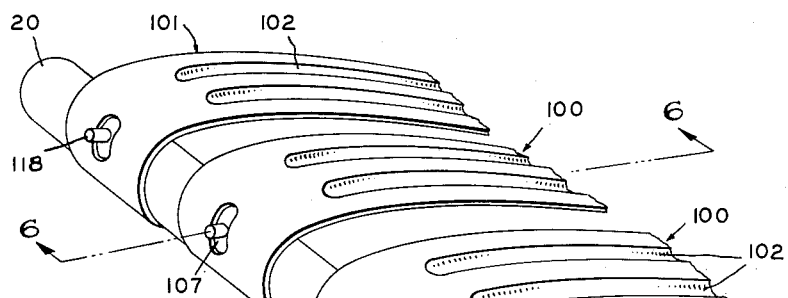
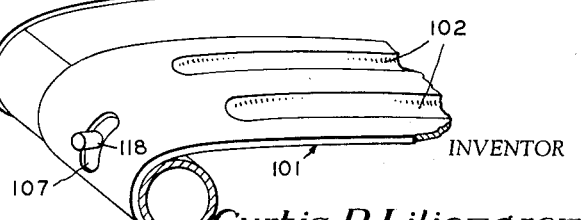
INVENTOR
Curtis P. Liljengren
BY Arthur Middleton
ATTORNEY

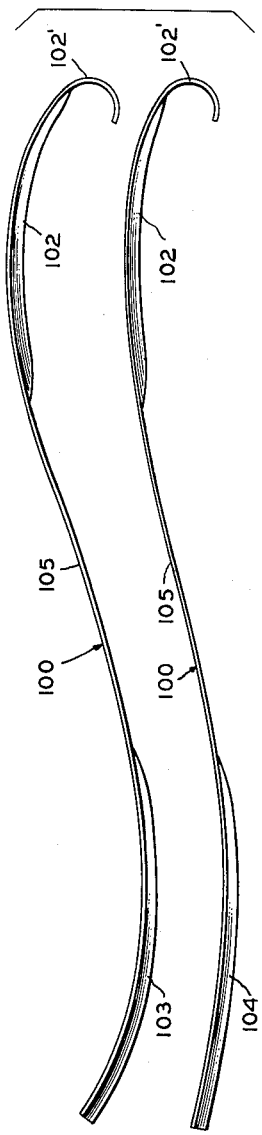
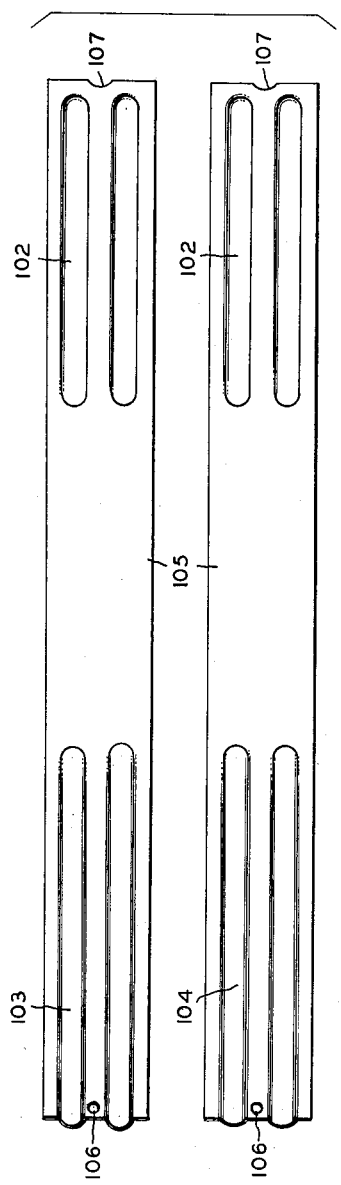
INVENTOR
Curtis P. Liljengren.
BY
ATTORNEY

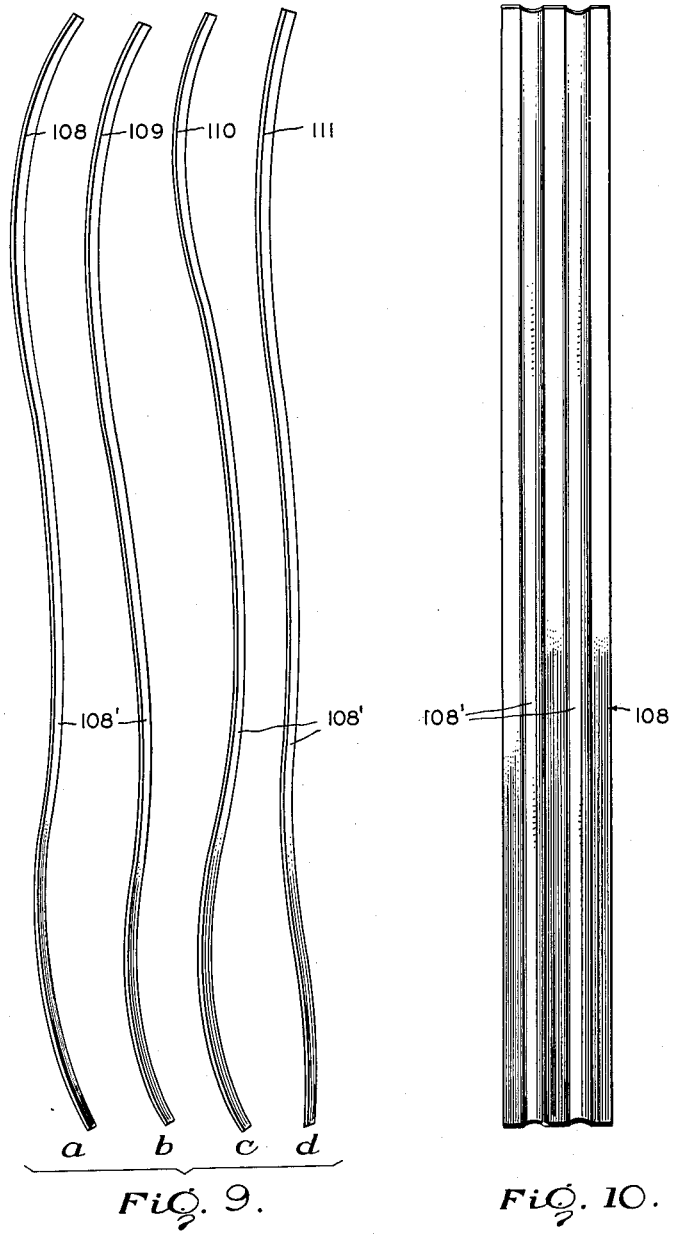

United States Patent Office 2,722,267
Patented Nov. 1, 1955

2,722,267

SEAT SPRING CONSTRUCTION

Curtis P. Liljengren, Miami, Fla.

Original application December 23, 1952, Serial No. 327,570. Divided and this application November 10, 1953, Serial No. 391,246

7 Claims. (Cl. 155—179)

This invention relates to a chair or seat construction, and its general object is to devise a more comfortable and body-conforming seat and back-rest combination that is comfortable even during long periods of occupancy, such as by seats of airplanes, trains and automobiles, but also in household chairs. Another object is to make such a back rest and seat that is sufficiently flexible so as to be resiliently deformable to conform itself to that portion of the sitter's body that is in contact therewith, but also to conform itself readily as the body may be moved from time to time. It is another object to devise such a seat and back-rest combination so that the seat and back rest at their juncture never offer a hammock-like effect, but maintain a certain angle of juncture that fits the sitter's posterior. Still another object is to provide a seat that has substantially more flexure in its transverse mid-portion than do its transverse edge portions, namely, it should belly downward more in its middle than its supported front and rear edge portions.

A further object of the present invention is to provide such a head-rest, back-rest and seat construction in accordance with the foregoing objects that minimizes the thickness requirements of the foam rubber or other covering commonly employed without loss of comfort but with substantial reduction in the weight of the covering as well as backing structure.

A further object is to provide an improved resilient head-rest on the upper portions of the chair back such that it will be readily resiliently conformable to the contour of the back of the head of the occupant irrespective of his height. And another object is to minimize the thickness of foam rubber or other covering ordinarily required for comfort in providing a rest for the head. Another object is to devise such a manner of mounting the component elements of the head-rest that each transversely disposed element has resilient axial mountings while the elements themselves are flexible perpendicularly of their longitudinal axes.

In accomplishing the foregoing objects, it is an objective to minimize the necessary weight of passenger-carrying airplanes to result in substantial increase in the payload capacity thereof.

Another object of the present invention is to provide simplified seat-back support frame means for mounting of the back and head-rest strips, which same means embodies stop engaging means for preventing forward folding of the seat back, unless desired, and also provides a portion, rigidly related to the main portion for mounting the strips, which can be readily co-operatively interconnected with the tilting mechanism within the side arm rest. A further object is to devise ways and means whereby the aforementioned can be constructed mainly from rod stock with light-weight rigidifying means associated therewith in the required components.

With these and other more detailed objects in view, the invention includes among other things a chair having a seat and back-rest, each made up, under their pads and upholstery, of a group of spaced-apart, specially pre- curved, resiliently deformable strips. The forward edge of the seat-forming strips is supported by a transverse support member such as a tube or rod which constitutes a part of the seat bottom frame. The seat-forming strips and the back-forming strips are held together at the juncture of their abutting free ends by axially stretchable means in the form of spring means and the juncture in turn is tied resiliently to a transverse fixed back member or tube of the seat bottom frame to tie the juncture thereto for limited movement with respect thereto. The back strips preferably have different body-conforming curvatures, with the central strip having the greatest curvature, the outer strips the least, and the intermediate strips an intermediate curvature. These strips are generally ox-bow in side contour. The seat strips preferably are S-shaped in side contour but particularly they are designed to have more deforming flexibility in their transverse mid-portion than at their end portions. Over the seat strips is secured a pad of soft or foam rubber and over the back rest is secured another such pad. These are then covered with upholstery.

As to the framework of each back support, there is provided a pair of shepherd's crook-like elements, the outer one differing somewhat from the inner or center element. The pair of crook-like elements is rigidly joined together at top and bottom by a pair of cross bars or rods, the top bar providing means to which the upper ends of the strips can be carried, and the upper curved ends of the crook-like element providing means to which the ends of the head-rest strips can be attached. Tapes or other binding straps are secured to the back and under sides of the seat back and bottom strips, respectively, to limit their relative spreading action. The tapes are shown in front of the strips in the drawing for the purpose of clarity of showing.

More specific details of the invention are described hereinafter.

The invention is therefore illustrated in the accompanying drawings in which:

Fig. 4 is a longitudinal vertical sectional view through one of the seats of the unit looking toward the center arm rest;

Fig. 5 is a detail perspective view of the front edge of the seat bottom showing a form of attachment of the seat bottom support straps;

Fig. 6 is a detail sectional view taken substantially along the plane of line 6—6 of Fig. 5;

Fig. 7 is an end elevational view showing the preferred differenital contours of a pair of seat bottom support straps;

Fig. 8 is a top plan view of the pair of seat bottom support straps shown in Fig. 7;

Fig. 9 is an end elevational view showing the preferred differential contours of the various seat back support straps, strap (a) corresponding to the center back support strap of Fig. 3 while straps (b), (c) and (d) correspond to the back support straps in order starting with the strap next adjacent either side of the center strap and continuing to the outermost strap at either side;

Fig. 10 is a front elevational view of the seat back support strap showing a preferred form for retaining the contour of the strap;

Figure 3:
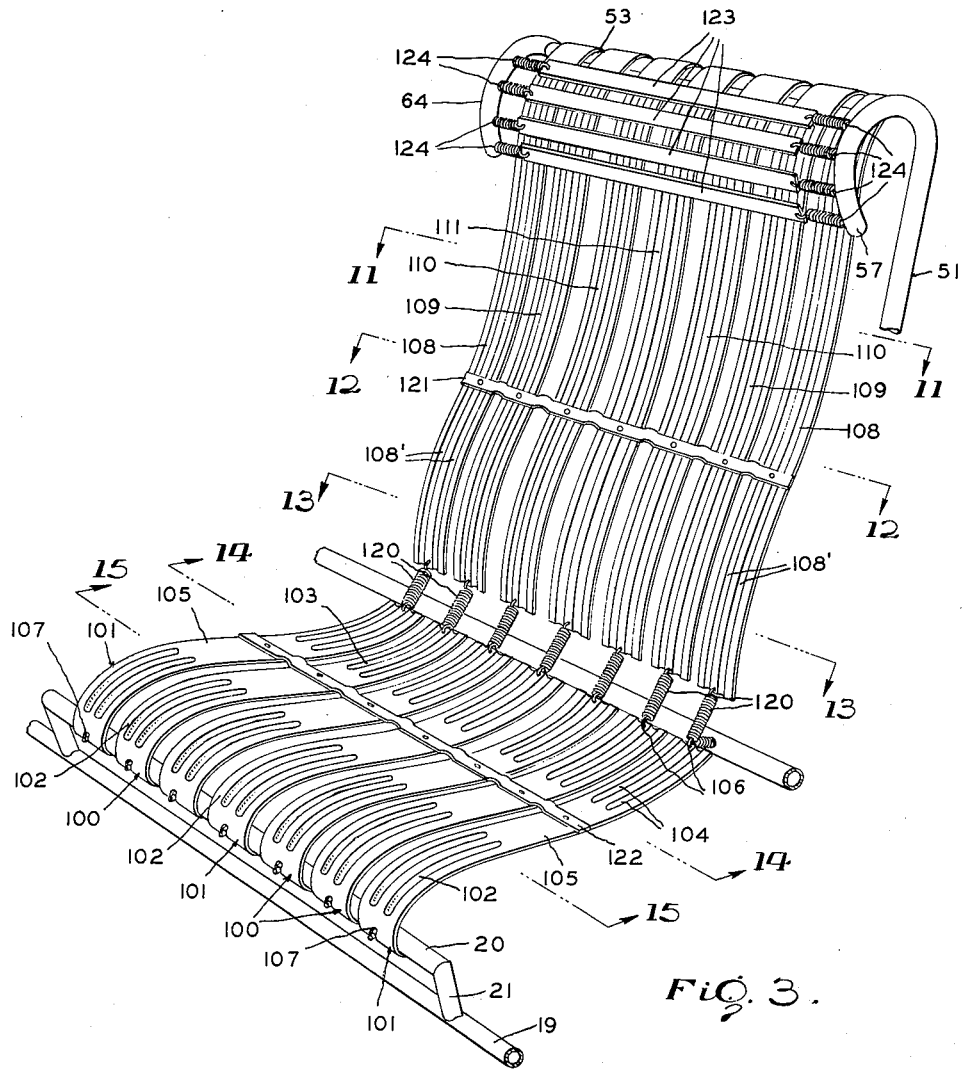
Fig. 3 is a detail perspective view showing the contour support straps and headrest straps installed on the seat framing structure.
Figure 11:
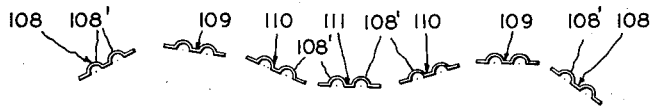
Figure 12:
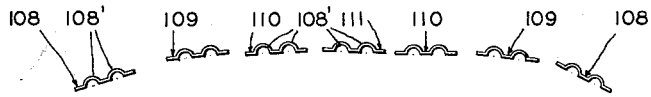
Figure 13:
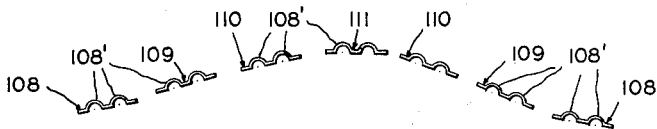
Figure 14:
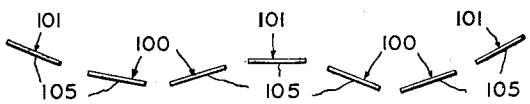
Figure 15:
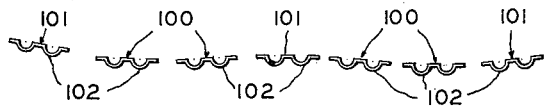

Figs. 11 through 13 are horizontal transverse sectional views taken substantially along the planes of lines 11—11, 12—12, and 13—13, respectively, in Fig. 3; and Figs. 14 and 15 are vertical transverse sectional views taken substantially along the planes of lines 14—14 and 15—15, respectively, in Fig. 3.

Figure 1:
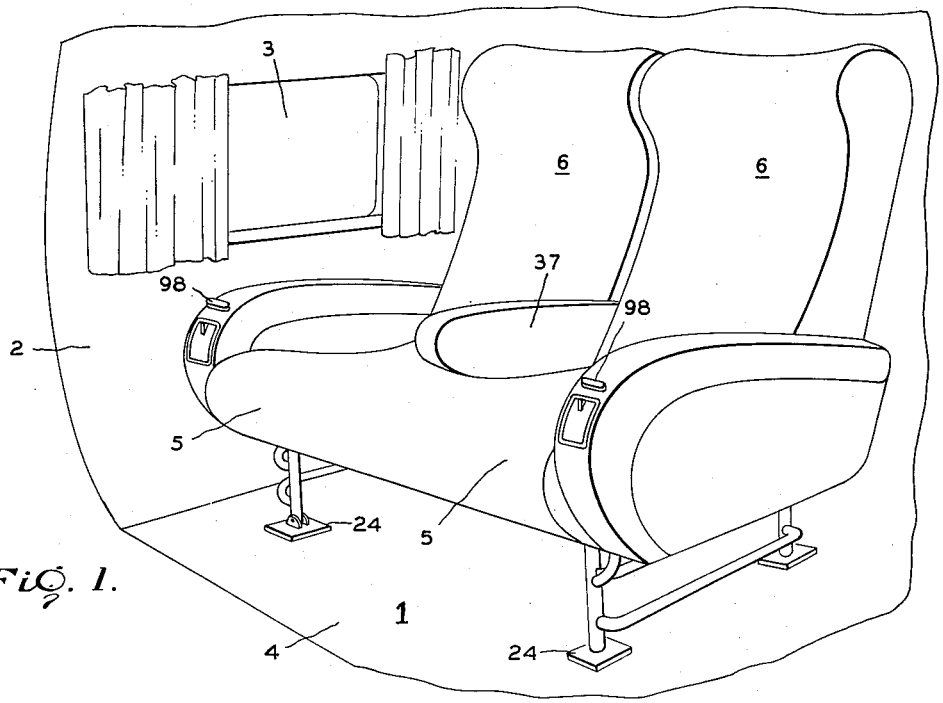
Figure 1 is a perspective view of a twin seat unit disposed in open operative position in the cabin of an airplane.

Referring to the drawings and keeping in mind that while as shown, a twin seat unit is disclosed, the principles of the instant invention can be embodied in a single seat unit such as for furniture, in a bus, in a train, or in an airplane, or in a unit comprised of more than two seats, Figure 1 shows a twin seat installed in an airplane cabin having a floor 1 and a side wall 2, which has a window 3. The aisle area is designated generally by the numeral 4 and the seat construction which constitutes the present invention is installed between the side wall and the aisle area, being attached to the floor by means of plates designated 24. The seat base mounts a seat bottom cushion generally designated 5, connected to the supporting frame in a suitable manner and has a back cushion member generally designated 6 which, in the illustrated embodiment, is reclinable to various angles under control of the recline rock mechanism hereinafter described.

Figure 2:
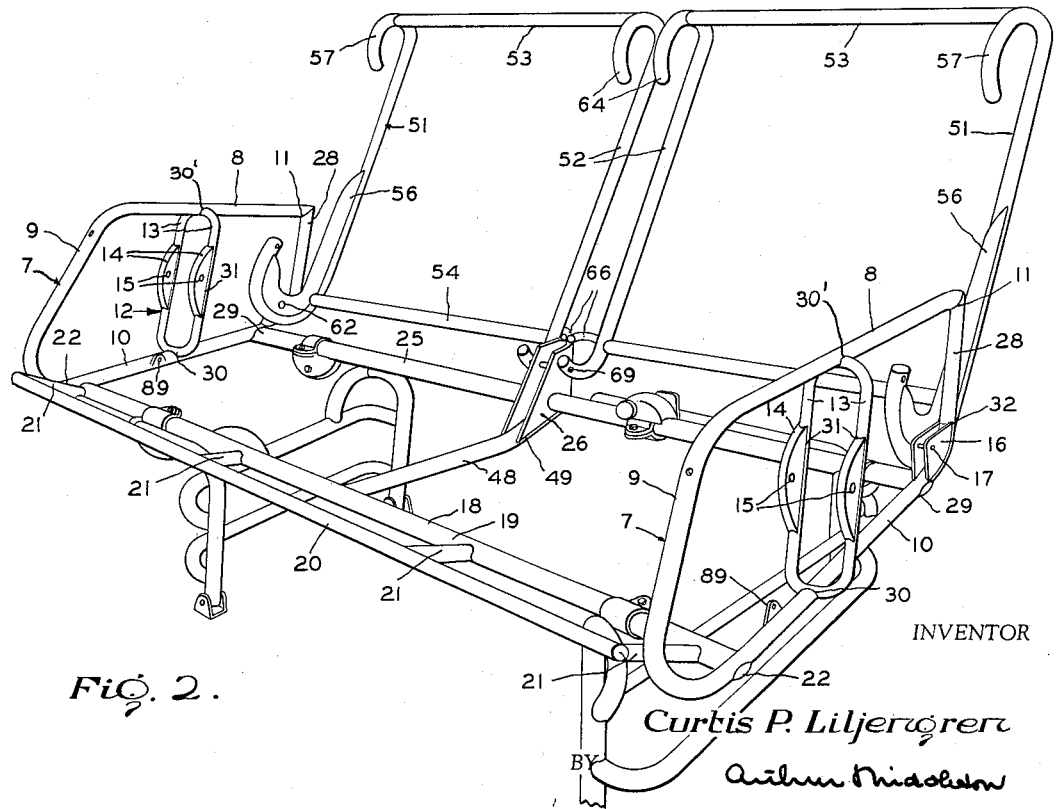
Fig. 2 is a perspective view of the seat unit framework.

The framing structure of the twin seat unit is shown best in Fig. 2. In the preferred embodiment shown, the structure is composed of light gauge, high strength steel tubing. Primary structural members may be made from ¾ inch diameter tubing with secondary structural members made from ⅝ inch diameter or smaller tubing. Of course, these dimensions can be varied as desired. The seat frame structure includes a side arm-rest frame structure generally denoted 7, which includes an endless element having a nearly horizontal upper support member on bar 8 which is diagonally downwardly and forwardly bent at its front end to form the front support member 9, which member connects with the horizontal portion 10, the upright portion 28 connecting the aft ends of bars or rods 8 and 10. The rod or bar stock employed has its ends secured together at 11 by suitable means such as welding. A recline lock mechanism support structure 12 is attached near the mid-point of the side framing structure 7 and consists essentially of a small diameter tube 13 bent in the shape of an elongated loop with its major axis at or near vertical and with its minor axis perpendicular to the plane of the side frame structure 7. Attachment of the loop 13 to the side frame structure 7 is made at 30 while the open ends of the loop 13 are secured to the bar 8 at 30'. A pair of relatively thin metallic plates 14 is attached to the legs of the loop 13 by welding at 31. Aligned holes parallel to the minor axis of the loop are drilled through the plates 14 to provide bearing housings in which are received through-welded bushings 15. Outboard back rest pivot support housing 16, formed from light gauge steel is welded at the intersection of tube 10 and 28, such attachment being denoted 32. The support housing 16 has aligned openings therethrough which have a through-welded bushing 17 extending therethrough, the axis of bushing 17 being parallel with the axis of bushings 15. Since the side frame structures at either side of the chair are alike, a description of one suffices for both. The side frame structures 7 thus provided are held in longitudinal spaced relation by a front longitudinal bar or rod 19 and a rear longitudinal bar or rod 25 welded to the side frame 7 at 22 and 29, respectively. A longitudinal tube 20 is held in parallel spaced relation to the member 19 by four struts 21. The rear longitudinal beam 25 includes a center armrest socket 26 attached at its mid-point. Having continued reference to Fig. 2, a fore and aft spreader tube 48 is welded to socket 26 at 29 and welded to tube 19 at their intersection. The main seat base framing is thus complete.

Each seat back 50 includes an outboard side support member 51 and an inboard side support member 52, both of which are shepherd's crook-like in form, connected by a top cross member bar or rod 53 and a bottom cross member bar or rod 54.

The seat back frames are pivotally connected to the main seat frame structure at the center by pivot bolt 69 shown in Fig. 2 and at the outboard sides by a pivot bolt installed through pivot bushing 17 shown in Fig. 2, the latter mentioned bolt operating through pivot bushing 62 in the seat-back outboard side support shepherd's crook member 51. Construction details of the seat bottom support member are best shown in Figs. 7 and 8. In the preferred embodiment illustrated, the seat-forming strip members are made of thin resilient sheet metal such as 24ST aluminum alloy of 0.032 thickness and approximately two inches wide, the foregoing being by way of example only. The seat strips are generally S shaped in side contour, as shown in Fig. 7, but particularly they are designed to have greater flexibility in their transverse mid-portion than at their end portions. Two strips designated generally 100 and 101 illustrate preferred shapes, it being noted that like end portions are reversely curved at 102'. One preferred method of permanently deforming or contouring the strips consists of impressing two parallel beads or ribs approximately ¼ inch wide and 3/16 inch deep into the thin metal.

Thus, the forward sections designated 102 and the aft portions designated 103 and 104 will continue to hold their contoured forms with the same remaining degree of flexibility while the mid-portions designated 105 remain completely flexible. Beading in the forward portions 102 serves to equalize the unit loading on the forward portion of the seat bottom cushion while beading in the aft portions 103 and 104 serves to prevent a hammock-like effect by always maintaining a certain angle of juncture between the seat-forming and back-forming strips to fit perfectly the sitter's posterior. As the occupant changes his sitting position, the flexible mid-portion 105 is free to adjust itself to the new contour required. In addition, damage to the beaded portions by anyone standing upon the seat bottom supports is eliminated since flexing is taken in the flexible mid-portion of the strips. Since the seat is composed of a plurality or group of strips, each individual strip may be contoured as necessary to provide a crosswise change in contour. Holes 106 provided near the aft end of the strips and elongated holes 107 near the front edge portion of the strips may be provided for mounting the strips on the seat frame as hereinafter explained.

A back support strip, as shown in Fig. 10, in the preferred embodiment illustrated herein, contains two parallel beads or channels extending throughout its entire length. Each one of the plurality or group of back-support or back-forming strips has a different contour in order to achieve varying cross-wise as well as varying vertical contour for the back support assembly. Where a group of vertical strips is utilized, as shown in Fig. 3, the shape of the two outermost strips $a$ may be represented by shape designated 108 in Fig. 9. The two strips $b$ adjacent the outermost strips just described may be represented by the shape designated 109. The strip $c$ represents the shape of the two strips 110 adjacent the center strips while the strip $d$ may represent the shape of the center strip 111.

Figures 11 through 15 are representative cross-section views taken on the cutting planes 11—11 through 15—15, respectively, of Fig. 3 further illustrating this principle.

One preferred method for attaching the contour strips to the seat and back frames is shown in Figs. 3, 4, 5 and 6, and is as follows:

The forward portion of each seat strip is rolled about the longitudinal cross-tube 20. To withstand large downloads, a spacer pin 118 such as a rivet is fastened through a hole in the front longitudinal tube member 20. The seat support strip generally designated 100 is snapped on over the member 20 with the spacer 118 in register with the elongated hole or slot designated 107. Thus, rotation of strip 100 on frame member 20 is restricted by slot 107. The aft portion of the strip 100 is supported by a tension spring 119 inserted in openings 106 in strip 100 and into holes in the rear longitudinal frame member 25. The back support strips may be riveted to the top cross member 53 of the back or otherwise secured and the back strips are suspended by means of tension springs 120 engaged in the holes 106 in corresponding seat bottom strips.

Thus individually suspended, the seat back and seat bottom strips are each capable of individual movement as necessary to conform to the individual occupant's sitting position and stature requirements. Furthermore, the occupant has no bodily contact with rigid structural members aft or above his knee area and the back support strips and seat bottom support strips are restricted from undue separation between strips by the addition of suitable flexible cloth webbing or tape designated 121 and 122, respectively, which is attached to the back side of individual contour strips by any suitable means such as riveting.

A yieldable self-contouring head-rest is formed at the top of the back by attaching light resilient metal strips 123 such as of aluminum, to the shepherd's crooks at 57 and 64 (see Fig. 3) by means of tension springs 124. Suitable padding such as foam rubber or other soft rubber, is disposed over the shepherd's crooks and serves to cushion the rigid members and provide "wings" or "ears" on the head-rest, such "wings" serving to hold the occupant's head comfortably near the center of the head-rest (see Figs. 1 and 4). The spring-loaded head-rest could be used with many types of seat construction but its use in combination with the particular type of cushion suspension herein shown is advantageous. The head-rest will adjust itself vertically to some extent to conform to the sitter's height. Further, the particular construction of the seat bottom and seat back allows the taller (and usually heavier) sitter to sit lower in the seat. Therefore, the head-rest unit and the cushion units cooperate to provide perfect head support for sitters of practically every build.

It is to be noted that in covering the chair of the present invention, foam rubber padding or other padding can be employed and suitable covering fabric utilized to envelop the same. Whereas, heretofore the seat back supports have required as much as 3–4 inches and the seat bottom has required 4–5 inches of foam rubber padding, with the strips of the present invention and their straight-line connection, deformation is not transferred from one seat bottom strip to its corresponding seat back strip, and the individual strips conform themselves to the requirements of the occupant, thereby resulting in reduced padding requirements. For example, the seat back support requires only one inch and the seat bottom only one and one-half inches of foam rubber. This, of course, lessens the cost of manufacture and also reduces weight. The use of aluminum in the framing with the construction as shown further results in reduced weight without loss of strength or rigidity.

As this invention may be embodied in several forms without departing from the spirit or essential characteristics thereof, the present embodiment is therefore illustrative and not restrictive, since the scope of the invention is defined by the appended claims rather than by the description preceding them and all changes that fall within the metes and bounds of the claims, or that are their functional as well as conjointly co-operative equivalents, are therefore intended to be embraced by those claims.

The subject matter of this patent application has been divided out from my co-pending patent application Serial No. 327,570, filed December 23, 1952.

I claim:

1. In a chair construction having a seat and a back with a framework including a pair of spaced horizontal support members, a transverse horizontal cross member interconnecting the forward ends of said horizontal support members, a rear cross member interconnecting the opposite ends of said horizontal support members, and a pair of spaced uprights connected at their lower ends to said horizontal support members, each of said uprights including an elongate main body portion and a forwardly and downwardly directed arcuate upper end portion, whereby the uprights are generally in the form of a shepherd's crook, a top cross member rigidly connecting said uprights and secured to said arcuate upper end portions of the uprights adjacent the junction of the upper extremities of the main body portions therewith, a plurality of elongate, flexible back support strips anchored at one end to said top cross member and secured at their opposite ends to said rear cross member, a plurality of spaced flexible head rest strips extending between the downturned portions of said arcuate upper end portions of the uprights, means resiliently connecting said head rest strips at their opposite ends to said arcuate upper end portions, whereby said head rest strips are spaced horizontally forwardly from the anchored upper ends of said back support strips.

3. In a chair construction having a seat and a back with a framework including a pair of spaced horizontal support members, a transverse horizontal cross member interconnecting the forward ends of said horizontal support members, a rear cross member interconnecting the opposite ends of said horizontal support members thus completing a framework, and a pair of spaced uprights connected at their lower ends to the rear section of said framework, a plurality of seat-forming strips extending between said forward transverse horizontal cross member and said rear cross member, each of said seat-forming strips having a downwardly curved forward end portion and an upwardly curved rear end portion with a relatively flat intermediate portion interconnecting the forward and rear portions thereof, each of the forward and rear end portions of the seat-forming strips having longitudinally extending reinforcing ribs formed therein whereby each seat-forming strip is flexible substantially only in the intermediate portion thereof, means for securing the forward extremity of each seat-forming strip to said forward cross member of the framework, and means resiliently connecting the rear extremities of the seat-forming strips to said rear cross member.

2. The seat construction according to claim 1 wherein a plurality of seat-forming strips are disposed between said forward cross member and said rear cross member, each of said seat-forming strips having a downwardly curved forward end portion and an upwardly curved rear end portion with a relatively flat intermediate portion interconnecting the forward and rear portions thereof, each of the forward and rear end portions of the seat-forming strips having longitudinally extending reinforcing ribs formed therein whereby each seat-forming strip is flexible substantially only in the intermediate portion thereof, means for securing the forward extremity of each seat-forming strip to said forward cross member of the framework, and means resiliently connecting the rear extremities of the seat-forming strips to said rear cross member.

4. The seat construction according to claim 3 wherein said forward cross member is provided with a plurality of spaced, projecting pins, and the forward extremities of said seat-forming strips being provided with elongate slots receiving said pins, whereby the forward ends of the seat-forming strips are movably secured to the framework.

5. The seat construction according to claim 3, with a top cross member connecting the spaced uprights, back-forming strips with their upper ends supported from the top cross member, and means resiliently connecting the lower ends of the back-forming strips to said rear cross member, said back-forming strips being of flexible metal pre-formed to substantially oxbowcross-sectional shape and having longitudinally extending re-inforcing ribs, whereby the seat-forming and the back-forming strips through the medium of their resiliently connected ends adjust themselves to give full contact with the sitter's body without regard to his stature or posture and thus exert equal body-supporting pressure throughout the area of the seat-forming and the back-forming strips.

6. In a chair construction having a seat and a back with a framework including a pair of spaced horizontal support members, a transverse horizontal cross member interconnecting the forward ends of said horizontal support members, a rear cross member interconnecting the opposite ends of said horizontal support members, and a pair of spaced uprights connected at their lower ends to said horizontal support members, each of said uprights including an elongate main body portion and a forwardly and downwardly directed arcuate upper end portion, whereby the uprights are generally in the form of a shepherd's crook, a top cross member rigidly connecting said uprights and secured to said arcuate upper end portions of the uprights adjacent the juncture of the upper extremities of the main body portions therewith, a plurality of elongate, flexible back support strips extending between said top cross member and said rear cross member, means rigidly securing the upper ends of said strips to said top cross member, means resiliently connecting the lower ends of said strips to said rear cross member, a plurality of spaced, flexible head rest strips extending between the downturned portions of said arcuate upper end portions of the uprights, means resiliently connecting said head rest strips at their opposite ends to said arcuate upper end portions, whereby said head rest strips are spaced horizontally forwardly from the anchored upper ends of said back support strips, a plurality of seat-forming strips extending between said forward transverse horizontal cross member and said rear cross member, each of said seat-forming strips having a downwardly curved forward end portion and an upwardly curved rear end portion with a relatively flat intermediate portion interconnecting the forward and rear portions thereof, each of the forward and rear end portions of the seat-forming strips having longitudinally extending reinforcing ribs formed therein whereby each seat-forming strip is flexible substantially only in the intermediate portion thereof, means for securing the forward extremity of each seat-forming strip to said forward cross member of the framework, and said means resiliently connecting the lower extremities of the back support strips to the rear cross member also resiliently connecting the rear extremities of said seat-forming strips to the rear cross member and to said back support strips.

7. In a chair construction, a framework comprising a pair of spaced horizontal support members, a front cross member interconnecting the forward ends of said support members, a secondary cross member positioned above and forwardly of said front cross member, a plurality of struts rigidly connecting the front and secondary cross members, a rear cross member interconnecting the rearward ends of said support members, and a pair of spaced uprights connected at their lower ends to said support members, a plurality of seat-forming strips extending between said rear cross member and said secondary cross member, each of said seat-forming strips having a downwardly curved forward end portion anchored at its extremity to said secondary cross member and an upwardly curved rearward end portion, means resiliently connecting said rearward end portions of the strips to said rear cross member, said upwardly curved rearward end portion of the seat-forming strips having longitudinally extending reinforcing ribs formed throughout their length, said downwardly curved forward end portions of the strips having reinforcing ribs formed throughout a substantial portion of their length but terminating in spaced relation to the forward ends thereof, and the intermediate portions of said strips being flat, whereby the greatest flexibility of said strips resides in said intermediate portions and the forward extremities of the strips.

References Cited in the file of this patent

UNITED STATES PATENTS

| 1,513,726 | Lamplugh | Oct. 28, 1924 |
| 1,879,724 | Wolpert | Sept. 27, 1932 |
| 2,202,301 | Probst | May 28, 1940 |
| 2,239,057 | Schlappritzi | Apr. 22, 1941 |
| 2,264,006 | Probst | Nov. 25, 1941 |
| 2,281,341 | Turner | Apr. 28, 1942 |
| 2,302,479 | Tallmadge | Nov. 17, 1942 |
| 2,572,482 | Hoven et al. | Oct. 23, 1951 |
| 2,656,877 | Woller | Oct. 27, 1953 |

FOREIGN PATENTS

| 550,624 | Great Britain | Jan. 18, 1943 |